United States Patent [19]
Stemmer et al.

[11] Patent Number: 5,858,045
[45] Date of Patent: Jan. 12, 1999

[54] MULTIPLE LAYER AIR FILTER MEDIA

[75] Inventors: Michael J. Stemmer, Collierville, Tenn.; Edward C. Sofsky, Batesville, Miss.

[73] Assignee: Air Kontrol, Inc., Batesville, Miss.

[21] Appl. No.: 755,566

[22] Filed: Nov. 27, 1996

[51] Int. Cl.[6] ................................................ B01D 46/54
[52] U.S. Cl. ......................................................... 55/486
[58] Field of Search ........................... 55/473, 482, 486, 55/492, 485, 487

[56] References Cited

U.S. PATENT DOCUMENTS

| | | | |
|---|---|---|---|
| 1,892,210 | 12/1932 | Gordon | 55/492 |
| 2,124,370 | 7/1938 | Gaarder | 55/492 |
| 2,804,936 | 9/1957 | Stampe | 55/492 |
| 3,388,536 | 6/1968 | Nash | 55/492 |
| 3,727,769 | 4/1973 | Scholl | 210/484 |
| 4,126,560 | 11/1978 | Marcus et al. | 55/487 X |
| 4,217,386 | 8/1980 | Arons et al. | 55/486 X |
| 4,324,574 | 4/1982 | Fagan | 55/487 |
| 4,631,077 | 12/1986 | Spicer et al. | 55/487 |
| 4,983,434 | 1/1991 | Sassa | 55/486 X |
| 5,049,172 | 9/1991 | Shary et al. | 55/495 |
| 5,507,847 | 4/1996 | George et al. | 55/486 |
| 5,690,719 | 11/1997 | Hodge | 55/486 X |

Primary Examiner—Harold Joyce
Attorney, Agent, or Firm—Foley & Lardner

[57] ABSTRACT

A filter media for an air filter includes at least two layers of filter material with the materials being different. The layers are joined together by a stiffening grid fabricated from a metal or plastic. Glue such as hot-melt glue is disposed on both sides of the grid to attach the sides of the grid to the respective layers. Depending upon the application, the filter media may be pleated.

25 Claims, 3 Drawing Sheets

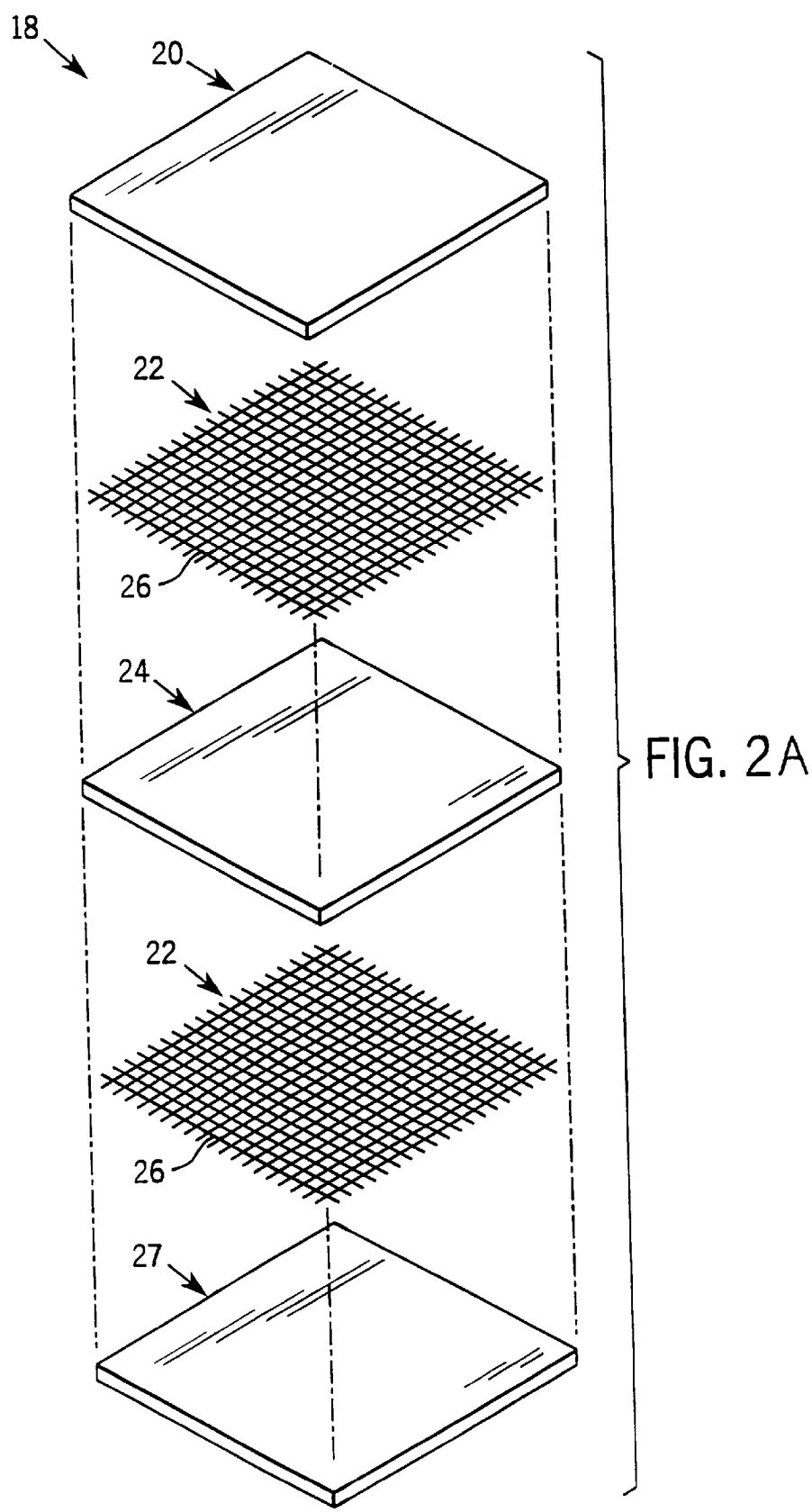

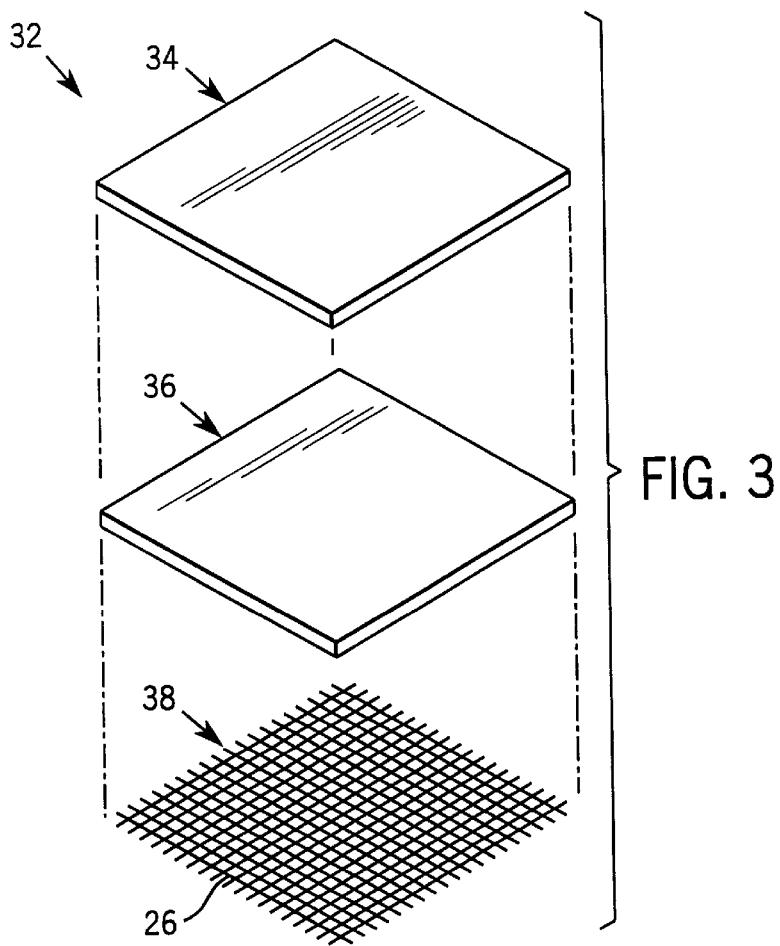
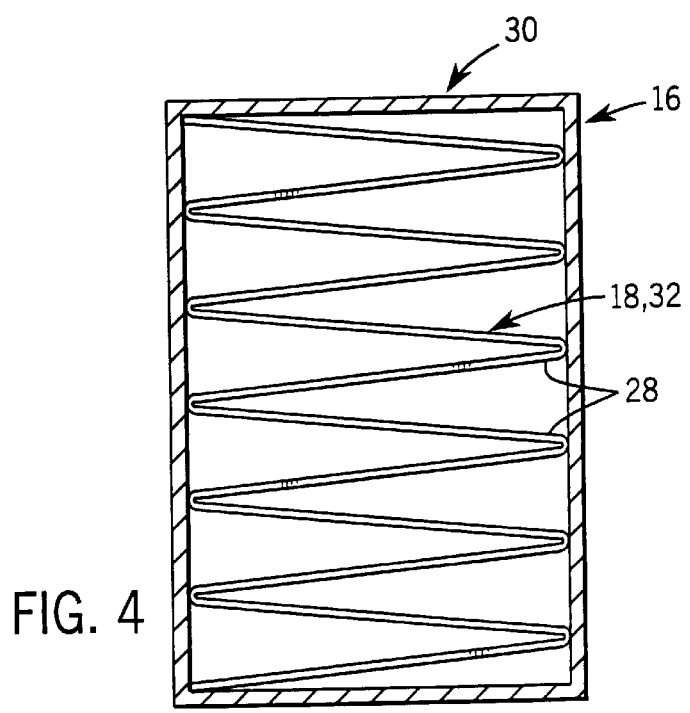

MULTIPLE LAYER AIR FILTER MEDIA

FIELD OF THE INVENTION

The present invention relates to an air filter for a forced air ventilation system such as the heating, ventilating and air conditioning (HVAC) system of a building. In particular, the present invention relates to a filter and filter media having at least two dissimilar filter material layers attached together.

BACKGROUND OF THE INVENTION

Air filters such as those used in HVAC systems are fabricated with many different types of filter media. Depending upon the type of substance sought to be filtered or removed from air (e.g. particles, carbon monoxide, smoke, formaldehyde, organics, etc.), or the useful filter life required, different medias are selected. Examples of such medias are wet or dried laid paper, synthetic microfiber media, metal mesh, wet or dried laid fiberglass, activated carbon impregnated media, tack coated polyester and synthetic media impregnated with potassium permanganate.

One of the problems which arises as a result of selecting a specific filter media for a specific filtering requirement (e.g. filtering carbon monoxide) is that filtering performance for other requirements such as particulate filtration may be sacrificed. Accordingly, it would be desirable to combine different types of filter material layers to produce a filter media which will meet more than one filtering requirement. It would also be desirable to provide an arrangement for joining the filter material layers to allow both layers to be supported with a support grid.

SUMMARY OF THE INVENTION

One embodiment of the present invention provides a filter media including a first layer of filter material, a second layer of filter material, and a stiffening grid including first and second sides. The first side of the stiffening grid is attached to the first layer and the second side is attached to the second layer.

In another embodiment of the present invention, the first layer, the second layer and the stiffening grid are folded to provide a plurality of pleats in the filter media.

Another embodiment of the present invention provides a forced air ventilation system. The system includes an air filter having a frame and a filter media supported by the frame. The filter media includes first and second layers of filter material and a stiffening grid having first and second sides. The first side is attached to the first layer and the second side is attached to the second side. The system also includes an air duct with the air filter supported therein, and a fan in fluid communication with the air duct to force air through the filter.

BRIEF DESCRIPTION OF THE DRAWINGS

FIG. 2A is an exploded, perspective view of the first embodiment of the filter media having a third filter layer;

FIG. 3 is an exploded, perspective view of a second embodiment of the filter media; and FIG. 4 is a sectional view of an air filter taken along line 4—4 in FIG. 1.

DETAILED DESCRIPTION OF THE PREFERRED EMBODIMENT

Figure 1:
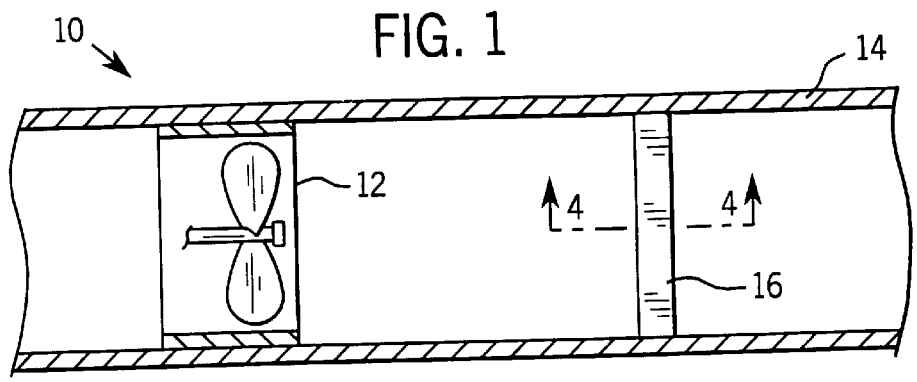
FIG. 1 is a schematic diagram of a forced air ventilation system.

Referring to FIG. 1, a forced air ventilation system 10 such as that of an HVAC system in a building includes an air circulation fan 12, an air duct 14 and an air filter 16. Filter 16 is supported in duct 14 with its faces being generally perpendicular to path of air flow within the duct. Filter 16 is supported within the duct by tracks or guides located therein (not shown). Duct 14 permits fluid communication between fan 12 and the portion of duct 14 which supports the filter.

In operation, fan 12 forces air through filter 16. Depending upon the type of material used to fabricate filter 16, filter 16 will filter and/or remove certain materials and chemicals forced therethrough by fan 12.

Figure 2:
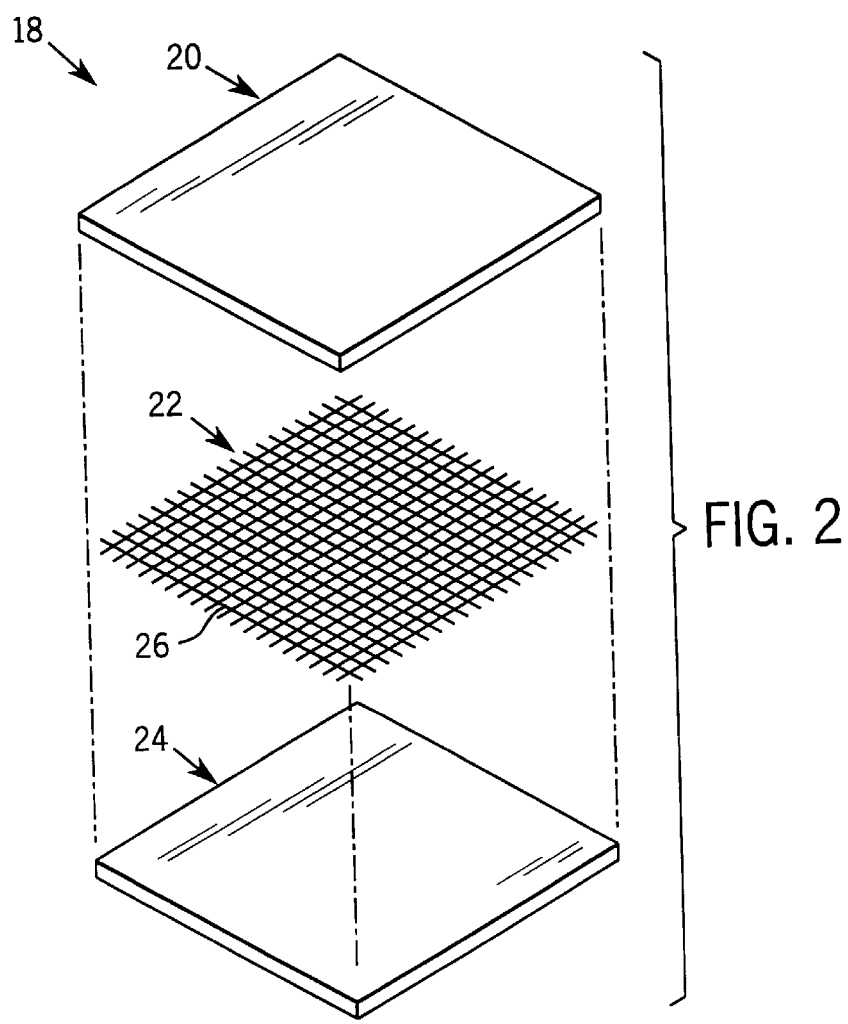
FIG. 2 is an exploded, perspective view of a first embodiment of a filter media.

Referring to FIG. 2, a filter media 18 used in filter 16 includes a filter layer 20 a stiffening grid 22 (e.g. screen, mesh, etc.), and a filter layer 24. Filter layers 20 and 24 may be fabricated from a variety of materials depending upon the selected filtering characteristics of filter 16. For example, layers 20 and 24 can be fabricated from wet and dried laid filter materials (e.g. paper, fiberglass, cotton, etc.), carbon impregnated media, tack coated polyester, synthetic media impregnated with potassium permanganate, and other materials depending upon the application.

Grid 22 can be fabricated from plastics or metals (e.g. aluminum, iron, steel, etc.), and the grid configuration can be varied in size and shape to include openings or interstices 26 between the grid material which permit air to flow therethrough. By way of specific example, grid 22 could be fabricated from aluminum sheet material manufactured (e.g. stamped) to include interstices 26.

Grid 22 secures layers 20 and 24 to each other. In particular, both sides of grid 22 are coated with a glue bonded thereto. The glue attaches layers 20 and 24 to grid 22 which provides attachment at locations dispersed over the abutting faces of layers 20 and 24. By way of example, the glue could be a hot-melt glue (e.g. HM55-30 sold by Progressive Adhesives) or an air drying glue.

By way of further example, filter media 18 may include more than two filter layers 20 and 24. For example, filter media 18 may further include a third filter layer 27 and stiffening pad 22 disposed between layers 24 and 27, as shown in FIG. 2A. Thus, layers 20, 24, and 27 of three-layer filter media 18 could consist of three different materials, such as an activated carbon impregnated media, a synthetic microfiber media and a synthetic media impregnated with potassium permanganate.

Filter media 18 is assembled using a method which includes applying the glue to both sides of grid 22 using a glue spraying or rolling apparatus, stacking grid 22 between layers 20 and 24, (between layers 24 and 27 for a three-layer filter media), and then compressing the stack until the glue cools, dries or cures. In an alternative embodiment, a thermoplastic grid 22 is used to join layers 20, 24 and 27. With this embodiment, the sides of grid 22 are heated before the stack is assembled and compressed. Alternatively, glue could also be used with the thermoplastic grid 22.

An advantage of using grid 22 to secure layers 20 and 24 together is that the placement of glue can be controlled to avoid increasing the air resistance of filter element 18 by depositing unnecessary glue on layers 20 and 24.

Referring to FIG. 4, pleats 28, can be formed by folding the assembled media 18. The use of a malleable metal grid 22 aids in retaining the shape and pleats of filter media 18 subsequent to folding. Alternatively, when a thermoplastic grid 22 is used, the shape and pleats of media 18 can be retained by heating media 18 at the fold lines.

Subsequent to completing filter media 18, it can be secured (e.g. glued) into an appropriate plastic, metal, paper or cardboard frame 30.

Referring back to FIG. 3, another embodiment of filter media 32 includes filter layers 34 and 36. However, in this embodiment, layers 34 and 36 are secured together by glue selectively applied to layer 34 and applied (e.g. robotically) to the top side of a grid 38. Subsequently, layers 34 and 36, and grid 38 are stacked and compressed. Layers 34 and 36, and grid 38 have structural characteristics similar to those described above for layers 20 and 24 and grid 22. A third filter layer (not shown) may be secured on top of layer 34, making filter media 32 a three-layer filter media. Similarly, the glues may be similar to those discussed above, and a thermoplastic grid 38 heated to create a bond with layer 36 could be used in place of a glued grid.

After filter media 32 is completed, it is pleated in a manner the same as that discussed above in reference to filter media 18.

While two embodiments and various modifications of the present filter have been described in detail above, other modifications of the filter could be made depending upon the application. For example, where additional stiffening is required for filter media 18, an additional grid could be attached (e.g. glued) to the unattached side of one or both of layers 20 and 24. Furthermore, as an alternative to stacking and compressing the filter elements during assembly as discussed herein, the filter media and stiffening grid materials could be supported on continuous rolls which are arranged to permit continuous lamination of the filter media. Using this process, the lamination is passed through rollers to compress the layers until bonding thereof is complete. Subsequently, the continuous lamination would be cut to appropriate filter media sizes and/or pleated. These modifications and others are intended to fall within the scope of our invention as defined by the claims set out below.

What is claimed is:

1. A filter media comprising:
   a first layer of a first type of filter material;
   a second layer of a second type of filter material different from the first type of material; and
   a stiffening grid including first and second sides, the first side of the stiffening grid being attached to the first layer and the second side being attached to the second layer.

2. The media of claim 1, wherein the material of the first layer is activated carbon impregnated media, and the material of the second layer is synthetic microfiber media.

3. The media of claim 2, further comprising:
   a third layer of filter material, wherein the material of the third layer is synthetic media impregnated with potassium permanganate; and
   a second stiffening grid including first and second sides, the first side of the second stiffening grid being attached to the second layer and the second side being attached to the third layer.

4. The media of claim 1, further comprising glue bonded to the first and second sides of the grid to attach the respective first and second layers to the grid.

5. The media of claim 4, wherein the glue is hot-melt glue.

6. The media of claim 4, wherein the glue is an air-drying glue.

7. The media of claim 5, wherein the grid is a metal grid.

8. The media of claim 7, wherein the media includes a plurality of pleats.

9. The media of claim 1, wherein the stiffening grid includes a malleable material.

10. The media of claim 9, wherein the malleable material comprises metal.

11. The media of claim 1, wherein the first layer, the second layer and the stiffening grid are folded to provide a plurality of pleats in the filter media.

12. A filter media comprising:
   a first layer of filter material comprising activated carbon impregnated media;
   a second layer of filter material comprising synthetic microfiber media joined to the first layer at a plurality of locations distributed between the layers;
   a stiffening grid attached to the first layer, wherein the first layer, the second layer and the stiffening grid are folded to provide a plurality of pleats in the filter media; and
   a third layer of filter material joined to the second layer at a plurality of locations distributed between the layers, the third layer being disposed on a side of the second layer opposite the first layer, wherein the material of the third layer is synthetic media impregnated with potassium permanganate.

13. The media of claim 12, further comprising glue bonded to the stiffening grid to attach the grid to the first layer.

14. The media of claim 13, wherein the glue is a hot-melt glue.

15. The media of claim 11, wherein the first layer is fabricated from a first type of filter material and the second layer is fabricated from a second type of filter material different from the first type.

16. A forced air ventilation system comprising:
   an air filter including a frame and a filter media supported by the frame, the filter media including first and second layers of filter material and a stiffening grid having first and second sides wherein the first layer is fabricated from a filter material different from the filter material of the second layer the first side is attached to the first layer and the second side is attached to the second layer;
   an air duct having the air filter supported therein; and
   a fan in fluid communication with the air duct to force air through the filter.

17. The system of claim 16, wherein the material of the first layer is activated carbon impregnated media and the material of the second layer is synthetic microfiber media.

18. The system of claim 17, further comprising:
   a third layer of filter material, wherein the material of the third layer is synthetic media impregnated with potassium permanganate; and
   a second stiffening grid having first and second sets, wherein the first side is attached to the second layer and the second side is attached to the third layer.

19. The system of claim 17, further comprising glue bonded to the first and second sides of the grid to attach the respective first and second layers to the grid.

20. The system of claim 19, wherein the glue is a hot-melt glue.

21. The system of claim 20, wherein the grid is fabricated from metal.

22. The system of claim 20, wherein the filter media is folded to include a plurality of pleats.

23. The system of claim 16, wherein the stiffening grid includes a malleable material.

24. The system of claim 23, wherein the malleable material comprises metal.

25. The system of claim 16, wherein the first layer, the second layer and the stiffening grid are folded to provide a plurality of pleats in the filter media.

* * * * *